(12) United States Patent
Zheng (10) Patent No.: US 9,459,440 B2
(45) Date of Patent: Oct. 4, 2016

(54) LINEAR POWER ADJUSTMENT MECHANISM FOR TELESCOPIC SIGHTS FOR FIREARMS

(71) Applicant: Jing Zheng, El Paso, TX (US)

(72) Inventor: Jing Zheng, El Paso, TX (US)

(73) Assignee: ROSS OPTICAL INDUSTRIES, El Paso, TX (US)

( * ) Notice: Subject to any disclaimer, the term of this patent is extended or adjusted under 35 U.S.C. 154(b) by 259 days.

(21) Appl. No.: 14/225,736

(22) Filed: Mar. 26, 2014

(65) Prior Publication Data

US 2015/0268459 A1    Sep. 24, 2015

Related U.S. Application Data

(60) Provisional application No. 61/805,614, filed on Mar. 27, 2013.

(51) Int. Cl.
*G02B 23/00* (2006.01)
*F41G 1/38* (2006.01)

(52) U.S. Cl.
CPC .............. *G02B 23/145* (2013.01); *F41G 1/38* (2013.01)

(58) Field of Classification Search
CPC .... G02B 23/00; G02B 23/14; G02B 23/145; F41G 1/38; F41G 1/387

USPC ....... 359/399, 421, 422, 425, 426, 676, 694; 42/111, 122–123, 130–148
See application file for complete search history.

(56) References Cited

U.S. PATENT DOCUMENTS 8,314,994 B1 * 11/2012 Thomas ............... G02B 23/145
                                                                 359/676
2002/0089767 A1 * 7/2002 Bell ........................ G02B 23/14
                                                                 359/823

* cited by examiner

*Primary Examiner* — Bumsuk Won
*Assistant Examiner* — Ephrem Mebrahtu
(74) *Attorney, Agent, or Firm* — Han IP Corporation; Andy M. Han (57) ABSTRACT

A telescopic sight for a firearm includes a scope tube, first and second optical lenses, an eyepiece set and a linear power adjustment mechanism. The optical lenses are contained in the scope tube and configured to move along a longitudinal axis of the scope tube. The eyepiece set is coupled to one end of the scope tube. The linear power adjustment mechanism adjusts zooming power of the telescopic sight, and includes a zoom cam tube and a lever that are contained in the zoom cam tube. The lever is coupled to rotate the zoom cam tube. When actuated, the lever moves linearly along a direction parallel to the longitudinal axis of the scope tube such that a distance between the first and the second optical lenses along the longitudinal axis of the scope tube to change to adjust a zooming power of the telescopic sight.

20 Claims, 6 Drawing Sheets

LINEAR POWER ADJUSTMENT MECHANISM FOR TELESCOPIC SIGHTS FOR FIREARMS

CROSS REFERENCE TO RELATED PATENT APPLICATION

This is a non-provisional application claiming the priority benefit of U.S. Patent Application No. 61/805,614, filed on 27 Mar. 2013, which is herein incorporated by reference.

TECHNICAL FIELD

The present disclosure generally relates to firearms. More specifically, the present disclosure relates to a telescopic sight for firearms.

BACKGROUND

A telescopic sight, also known as a scope or zoom scope, is a sighting device that is based on an optical refracting telescope. Telescopic sights are equipped with some form of graphic image pattern, referred to as a reticle, mounted in an optically appropriate position to provide an accurate aiming point. Telescopic sights are used with a variety of types of systems that require accurate aiming and are commonly found on firearms, e.g., rifles in particular.

Telescopic sights based on refracting telescopes using image erector lenses to present the user, or operator, with an upright image typically have two planes of focus where a reticle can be placed—at the focal plane between the objective and the image erector lens system or the focal plane between the image erector lens system and the eyepiece set. A typical telescopic sight has a circular actuation mechanism to adjust the zooming power. However, there are some drawbacks associated with the circular actuation mechanism. Firstly, a clearance cut on the scope tube of the telescopic sight significantly undermines the structural strength of the telescopic sight. More importantly, the motion of turning the zoom ring of the telescopic sight circumferentially would first cause movement of the firearm on which the telescopic sight is mounted, such that the user would temporarily lose the acquisition of the target. Secondly and most importantly, when adjusted from the minimum to the maximum zooming power, some telescopic sights would require more than one turning action by the user to achieve such power change (also known as long throw adjustment). In combat actions and in some shooting sports, such actuation would negatively impact the firearm user in acquiring the target quickly and shooting effectively.

SUMMARY

The present disclosure is directed to a telescopic sight with a linear power adjustment mechanism.

In one aspect, a telescopic sight for a firearm may comprise a lens set, a scope tube that contains a lens tube and a cam tube, an eyepiece set, and a linear power adjustment mechanism. The lens set may comprise at least a first optical lens and a second optical lens. The lens set may be contained in the lens tube, which is contained in the cam tube. The lens tube may be non-rotatable with respect to the scope tube and configured to allow the optical lenses of the lens set to slide therein along with a longitudinal axis of the scope tube. The eyepiece set may be coupled to one end of the scope tube. The linear power adjustment mechanism may be configured to adjust a zooming power of the telescopic sight, and may comprise a zoom cam tube and a lever. The cam tube may be contained in and connected to the zoom cam tube. The lever may be coupled to rotate the zoom cam tube and may be configured to be actuated to move linearly along a direction parallel to the longitudinal axis of the scope tube such that, when actuated, the zoom cam tube and the cam tube rotate around the longitudinal axis of the scope tube with respect to the scope tube and the lens tube to cause a distance between the first and the second optical lenses along the longitudinal axis of the scope tube to change to adjust the zooming power of the telescopic sight.

In at least one embodiment, the linear power adjustment mechanism may further comprise an actuation rod to which the lever is coupled. The actuation rod may be configured to move along the direction parallel to the longitudinal axis of the scope tube when the lever is actuated.

In at least one embodiment, the actuation rod may include an actuation block thereon to which the lever is attached.

In at least one embodiment, an exterior surface of the zoom cam tube may include a cam groove that spirals around at least a portion of the exterior surface of the zoom cam tube.

In at least one embodiment, the linear power adjustment mechanism may further comprise a cam pin coupled to an end of the actuation rod. The cam pin may engage the cam groove to cause the zoom cam tube to rotate around the longitudinal axis of the scope tube when the lever is actuated.

In at least one embodiment, the linear power adjustment mechanism may further comprise a guide groove that guides the cam pin and, together with the cam groove, causes the zoom cam tube to rotate when the lever is actuated.

In at least one embodiment, the cam tube may be fixedly connected to the zoom cam tube via a through hole on the cam tube and a threaded through hole on the zoom cam tube.

In at least one embodiment, the lever may be mounted on left side of the telescopic sight from a perspective of a user of the firearm.

In at least one embodiment, the lever may be mounted on right side of the telescopic sight from a perspective of a user of the firearm.

In at least one embodiment, the lever may be mounted on both left and right sides of the telescopic sight from a perspective of a user of the firearm.

In another aspect, an apparatus may comprise a firearm and a telescopic sight mounted on the firearm. The telescopic sight may comprise a lens set, a scope tube that contains a lens tube and a cam tube, an eyepiece set, and a linear power adjustment mechanism. The lens set may comprise at least a first optical lens and a second optical lens. The lens set may be contained in the lens tube, which is contained in the cam tube. The lens tube may be non-rotatable with respect to the scope tube and configured to allow the optical lenses of the lens set to slide therein along with a longitudinal axis of the scope tube. The eyepiece set may be coupled to one end of the scope tube. The linear power adjustment mechanism may be configured to adjust a zooming power of the telescopic sight, and may comprise a zoom cam tube and a lever. The cam tube may be contained in and connected to the zoom cam tube. The lever may be coupled to rotate the zoom cam tube and may be configured to be actuated to move linearly along a direction parallel to the longitudinal axis of the scope tube such that, when actuated, the zoom cam tube and the cam tube rotate around the longitudinal axis of the scope tube with respect to the scope tube and the lens tube to cause a distance between the first and the second optical lenses along the longitudinal axis of the scope tube to change to adjust the zooming power of the telescopic sight.

In at least one embodiment, the linear power adjustment mechanism may further comprise an actuation rod to which the lever is coupled. The actuation rod may be configured to move along the direction parallel to the longitudinal axis of the scope tube when the lever is actuated.

In at least one embodiment, the actuation rod may include an actuation block thereon to which the lever is attached.

In at least one embodiment, an exterior surface of the zoom cam tube may include a cam groove that spirals around at least a portion of the exterior surface of the zoom cam tube.

In at least one embodiment, the linear power adjustment mechanism may further comprise a cam pin coupled to an end of the actuation rod. The cam pin may engage the cam groove to cause the zoom cam tube to rotate around the longitudinal axis of the scope tube when the lever is actuated.

In at least one embodiment, the linear power adjustment mechanism may further comprise a guide groove that guides the cam pin and, together with the cam groove, causes the zoom cam tube to rotate when the lever is actuated.

In at least one embodiment, the cam tube may be fixedly connected to the zoom cam tube via a through hole on the cam tube and a threaded through hole on the zoom cam tube.

In at least one embodiment, the lever may be mounted on left side of the telescopic sight from a perspective of a user of the apparatus.

In at least one embodiment, the lever may be mounted on right side of the telescopic sight from a perspective of a user of the apparatus.

In at least one embodiment, the lever may be mounted on both left and right sides of the telescopic sight from a perspective of a user of the apparatus.

These and other objectives of the present disclosure will be appreciated by those of ordinary skill in the art after reading the following detailed description of the preferred embodiments that are illustrated in the various figures and drawings.

BRIEF DESCRIPTION OF THE DRAWINGS

The accompanying drawings are included to provide a further understanding of the disclosure, and are incorporated in and constitute a part of the present disclosure. The drawings illustrate embodiments of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF THE PREFERRED EMBODIMENTS

Overview

Various embodiments of the present disclosure relate to a linear power adjustment mechanism for telescopic sights for firearms. The linear power adjustment mechanism is designed to change the circular movement, or rotation, of the power adjustment mechanism for telescopic sight to linear motion, thus addressing the aforementioned issues with conventional telescopic sights.

Reference will now be made in detail to the preferred embodiments of the present disclosure, examples of which are illustrated in the accompanying drawings. Wherever possible, the same reference numbers are used in the drawings and the description to refer to the same or like parts.

The position terms used in the present disclosure, such as "front", "forward", "rear", "back", "top", "bottom", "left", "right", "head", "tail" or the like assume a firearm in the normal firing position, with the firearm being in a position in which the longitudinal axis of the barrel of the firearm runs generally horizontally and the direction of firing points "forward" away from the operator of the firearm. The same convention applies for the direction statements used herein.

Figure 1:
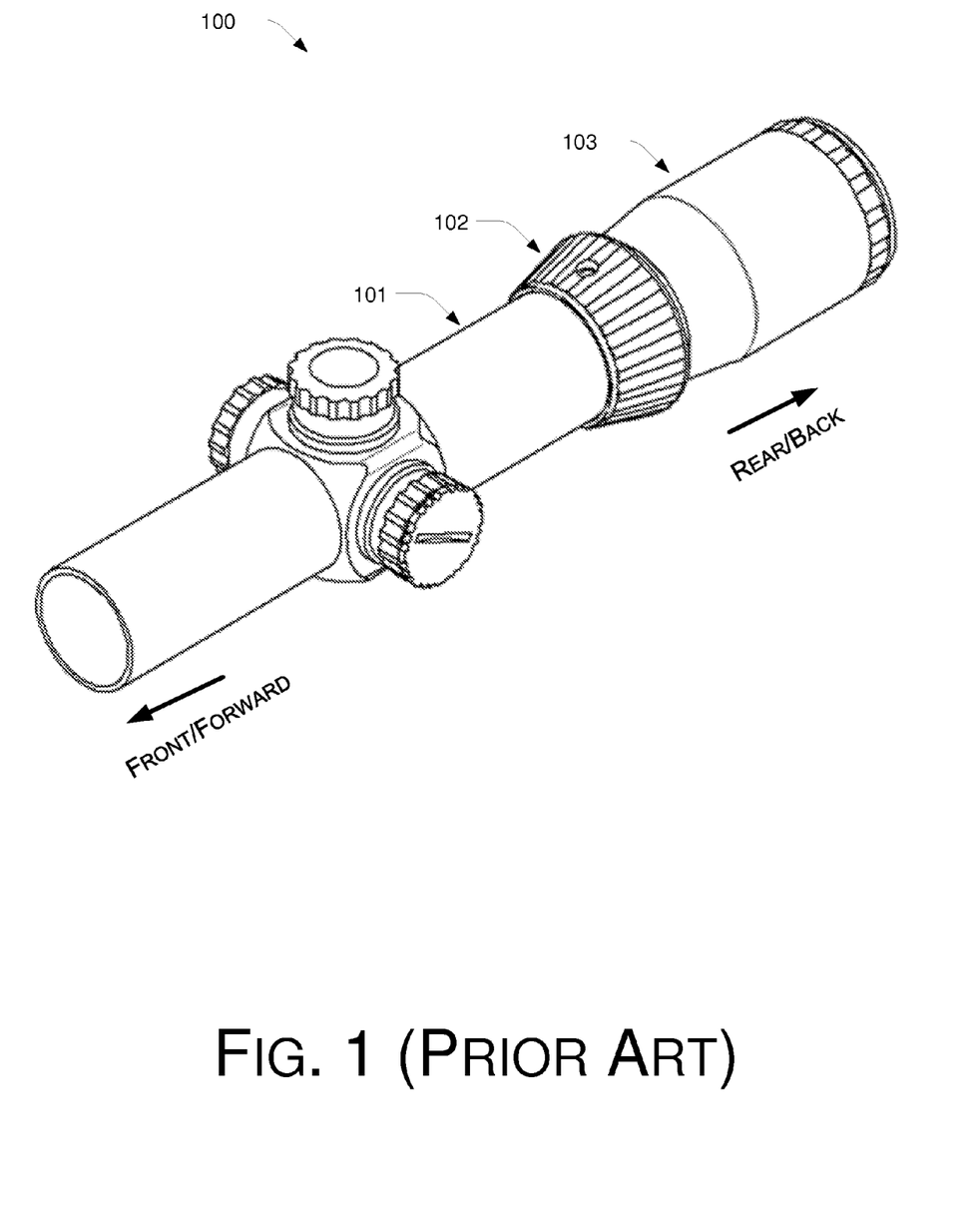
FIG. 1 is a perspective view of a conventional telescopic sight.
Figure 2:
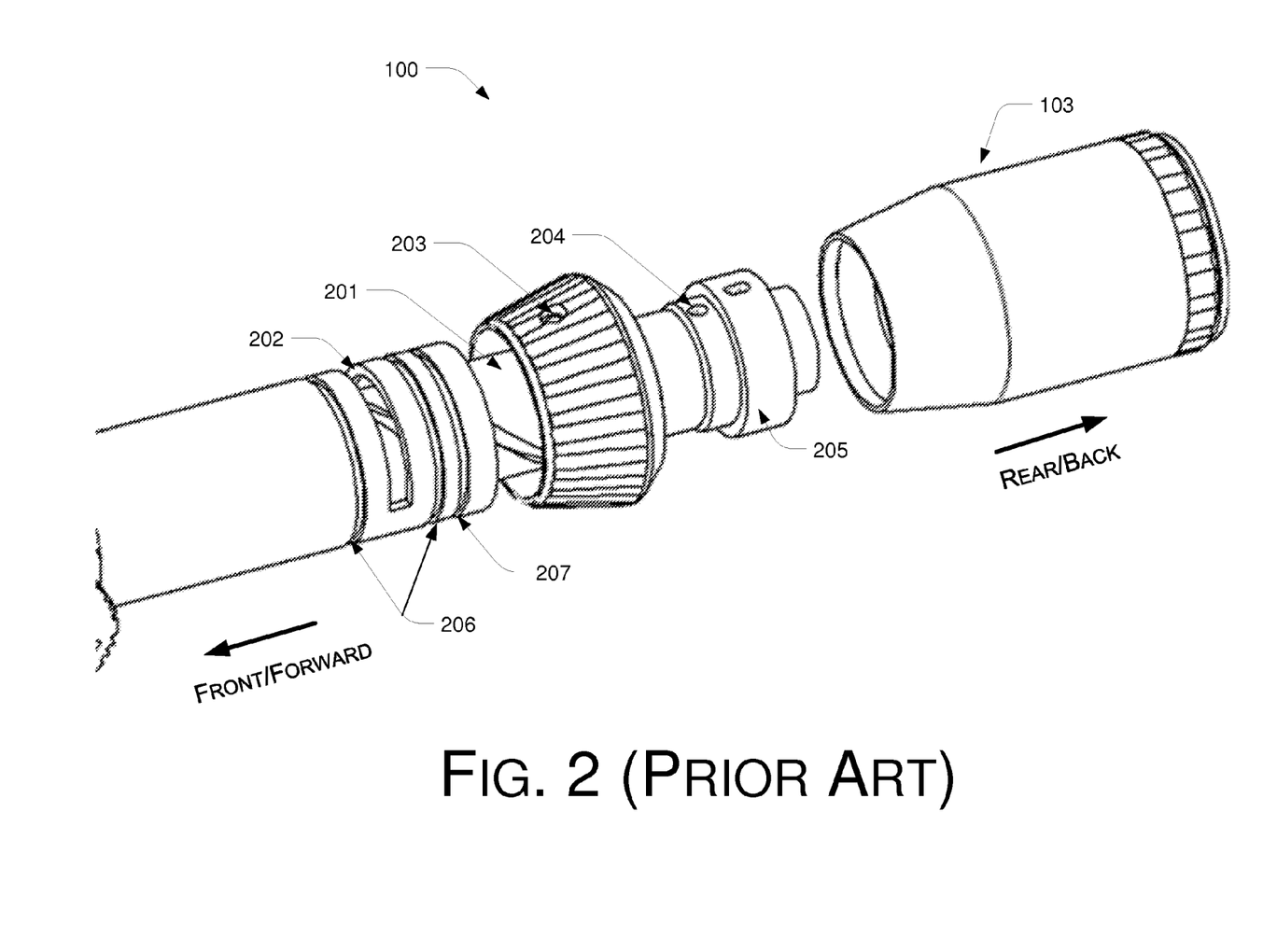
FIG. 2 is a partial exploded view of the conventional telescopic sight of FIG. 1.
Figure 3:
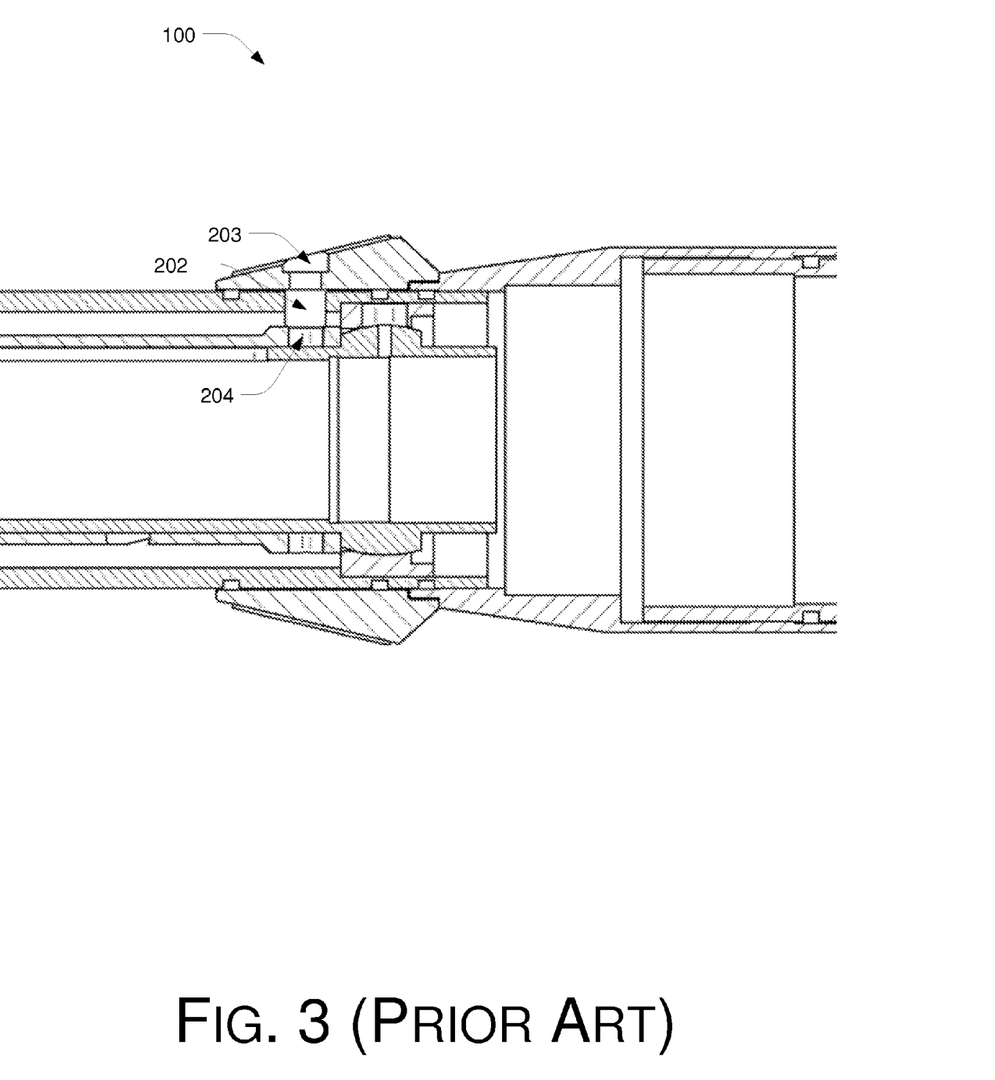
FIG. 3 is a partial cross-sectional side view of the conventional telescopic sight of FIG. 1.

FIGS. 1-3 illustrate various views of a conventional telescopic sight 100. Referring to FIG. 1-3, conventional telescopic sight 100 includes a scope tube 101, a zoom ring 102 and an eyepiece set 103.

The zoom ring 102 can be turned clockwise or counter-clockwise so that the cam tube 201 can be turned accordingly. The zoom ring 102 is connected to a cam tube 201 through a clearance cut 202 on the scope tube 101 by a screw (not shown). The screw is fastened on a connecting hole 203 on the zoom ring 102 and tangent to an elongated hole 204 on the cam tube 201. The screw is movable axially inside the elongated hole 204, but not circularly. This is due to the need that the cam tube 201 is mounted on a gimbal mount 205, which is fastened to the scope tube 101. The cam tube 201 can be moved vertically and horizontally due to the crosshair adjustment of the telescopic sight 100. Such installation relationship between the zoom ring 102 and cam tube 201 ensures the cam tube 201 can be rotated to achieve the power zooming feature of the telescopic sight 100, while allowing the cam tube 201 to be movable horizontally and vertically to allow windage and elevation adjustment of the telescopic sight 100. A rubber seal ring (not shown) is fitted inside of a zoom ring seal groove 206 and another seal ring that is fitted inside an eyepiece seal groove 207 are to achieve an air-tight seal of the telescopic sight 100 against environmental effects acting on the telescopic sight 100 and its lens coating.

The circular or rotational actuation mechanism of the zoom ring 102 has been the method of choice for telescopic sights for decades. However, there are issues associated with such design as mentioned above.

Example Telescopic Sight of the Present Disclosure

Figure 4:
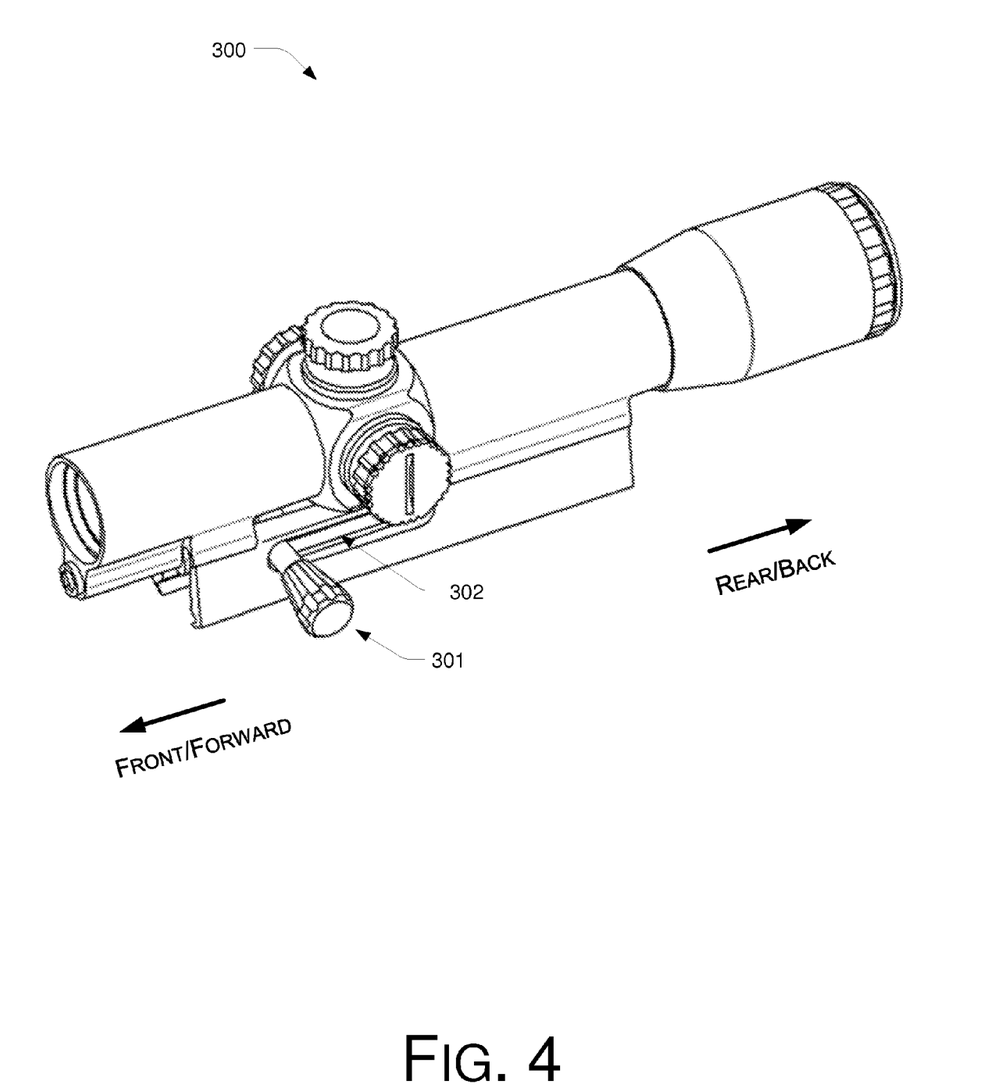
FIG. 4 is a perspective view of a telescopic sight in accordance with the present disclosure.
Figure 5:
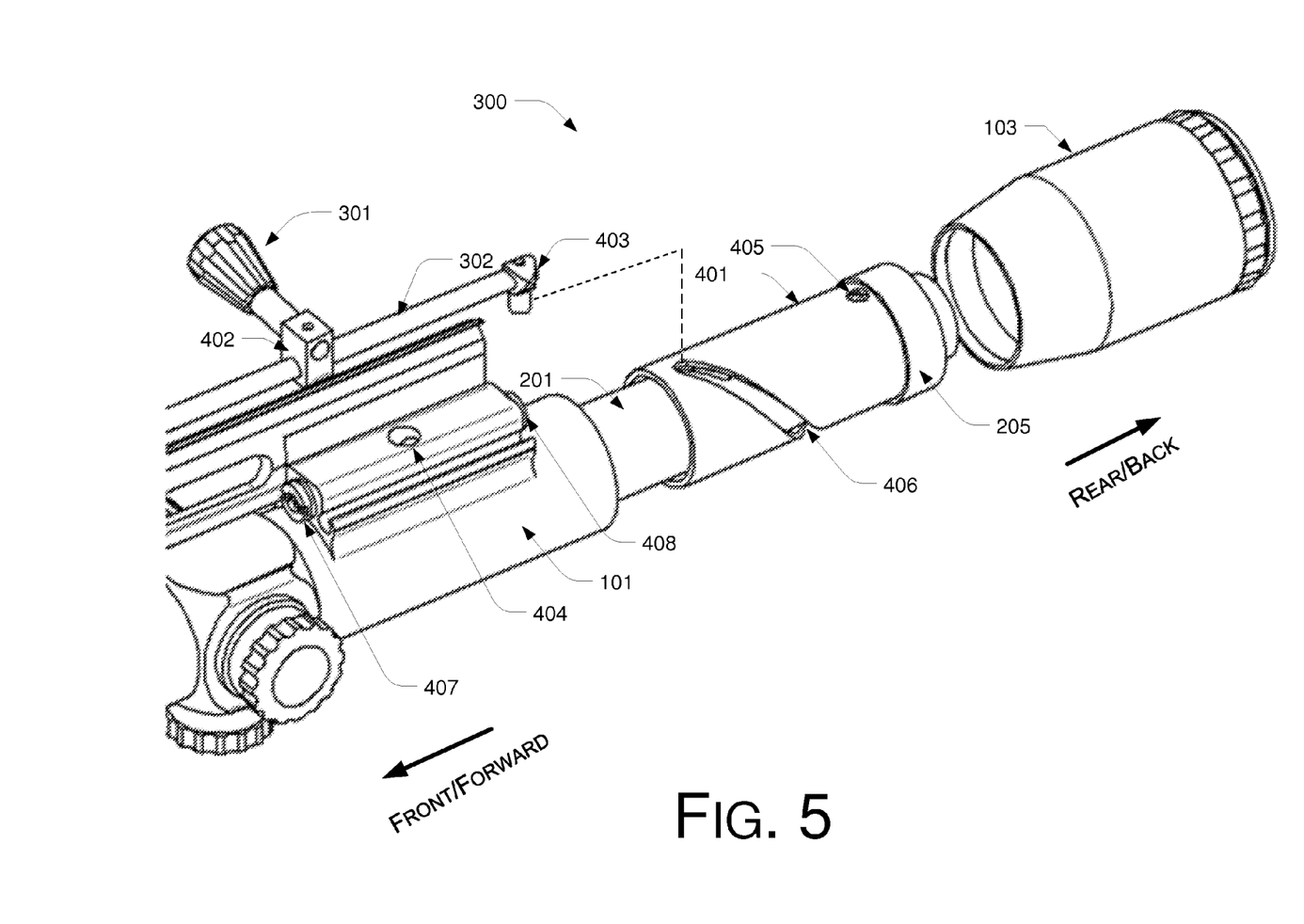
FIG. 5 is a partial exploded view of the telescopic sight of FIG. 4 in accordance with the present disclosure.
Figure 6:
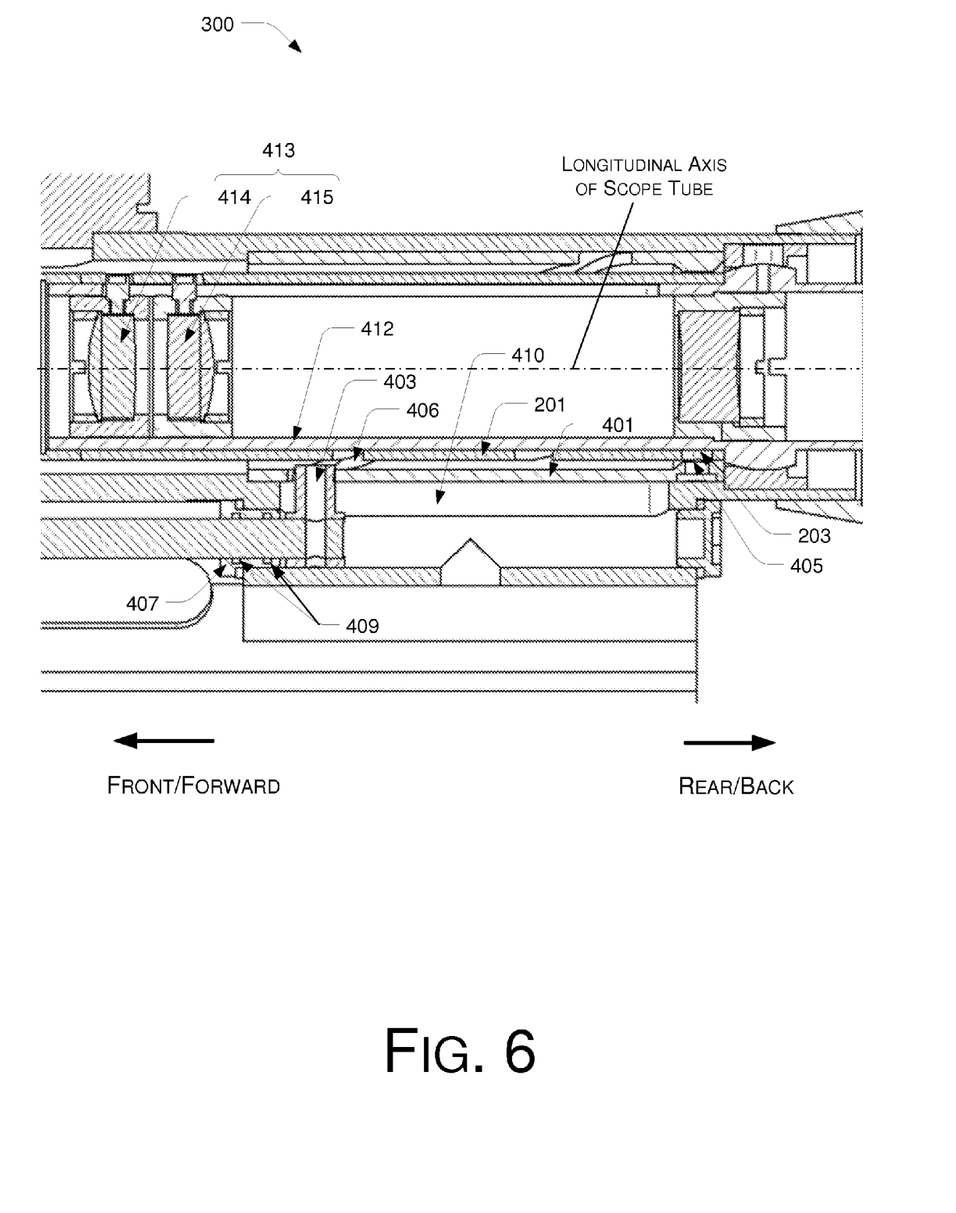
FIG. 6 is a partial cross-sectional side view of the telescopic sight of FIG. 4 in accordance with the present disclosure.

FIGS. 4-6 illustrate various view of a telescopic sight 300 in accordance with the present disclosure. Referring to FIG. 4-6, telescopic sight 300 includes a scope tube 101 and an eyepiece set 103, but does not have the zoom ring 102 as does the conventional telescopic sight 100. Instead, telescopic sight 300 includes a linear power adjustment mechanism in place of the zoom ring 102.

As shown in FIG. 4-6, the linear power adjustment mechanism includes a zoom lever 301 that, through an actuation rod 302, transfers a linear motion to a zoom cam tube 401. The zoom cam tube 401 in turn transfers the linear motion into a circular or rotational motion. The actuation cam tube 401 is coupled, attached or otherwise fastened to the cam tub 201, so that cam tube 201 will turn along with the zoom cam tube 401 to change the zooming power of telescopic sight 300.

As shown in FIG. 6, the scope tube 101 contains a lens tube 412 and the cam tube 201 therein, with the lens tube 412 being contained in the cam tube 201. The lens tube 412 is non-rotatable with respect to the scope tube 101 while the cam tube 201 and the zoom cam tube 401 are rotatable around the longitudinal axis of the scope tube 101. The lens tube 412 contains a lens set 413 therein to allow optical lenses 414 and 415 of the lens set 413 to slide therein along with the longitudinal axis of the scope tube 101.

In one embodiment, the zoom cam tube 401 is coupled to the cam tube 201 through a screw hole 405. The cam tube 201 is not changed compared to that of telescopic sight 100. The screw is fastened on screw hole 405, just like the screw is fastened on screw hole 203 on the zoom ring 102. A zoom cam pin 403 is mounted to actuation rod 302 though a clearance hole 404, which also double serves as the hole housing an air exchange lug (not shown) for the final assembly.

The cam pin 403 engages a cam groove 406 on the zoom cam tube 401. The cam groove 406 spirals at least a portion of an exterior surface of the zoom cam tube 401. There is a clearance groove 410 (or referred to as guide groove), for the travel of cam pin 403, between two seal plugs 407 and 408 on the scope tube 101. Plug 407 has a rod guide hole to accommodate actuation rod 302, and also has two built-in rubber seal rings to seal off the telescopic sight 300. An actuation block 402 on the actuation rod 302, to which zoom lever 301 is attached, transfers the force exerted on zoom lever 301 by a user of the firearm. The zoom lever 301 can be mounted on either the left (shown) or the right side (not shown) of the telescopic sight 300 from the perspective of the user of the firearm, or both sides (not shown), depending on user preference.

The linear power adjustment mechanism also includes the clearance groove 410 on the scope body, for guiding cam pin 403, together with cam groove 406, to rotate the zoom cam tube 401. Zoom cam tube 401 and scope tube 101 are fixedly connected via a threaded through hole 405 and an elongated through hole 203 the same way that the zoom ring 102 and cam tube 201 are connected.

In summary, in one aspect, the telescopic sight 300 for a firearm in accordance with the present disclosure includes a lens set 413, a scope tube 101 that contains a lens tube 412 and a cam tube 201, an eyepiece set 103, and a linear power adjustment mechanism. The lens set 413 includes at least a first optical lens 414 and a second optical lens 415. The lens set 413 is contained in the lens tube 412, which is contained in the cam tube 201. The lens tube 412 is non-rotatable with respect to the scope tube 101 and is configured to allow the optical lenses 414 and 415 of the lens set 413 to slide therein along with a longitudinal axis of the scope tube 101. The eyepiece set 103 is coupled to one end of the scope tube 101 (e.g., the rear end which is toward the user of the firearm). The linear power adjustment mechanism is configured to adjust a zooming power of the telescopic sight 300, and includes a zoom cam tube 401 and a lever 301. The cam tube 201 is contained in and connected to the zoom cam tube 401. The lever 301 is coupled to rotate the zoom cam tube 401 and is configured to be actuated to move linearly along a direction parallel to the longitudinal axis of the scope tube 101 such that, when actuated, the zoom cam tube 401 and the cam tube 201 rotate around the longitudinal axis of the scope tube 101 with respect to the scope tube 101 and the lens tube 412 to cause a distance between the first and the second optical lenses 414 and 415 along the longitudinal axis of the scope tube 101 to change to adjust the zooming power of the telescopic sight 300.

In at least one embodiment, the linear power adjustment mechanism further includes an actuation rod 302 to which the lever 301 is coupled. The actuation rod 302 is configured to move along the direction parallel to the longitudinal axis of the scope tube 101 when the lever 301 is actuated.

In at least one embodiment, the actuation rod 302 includes an actuation block 402 thereon to which the lever 301 is attached.

In at least one embodiment, an exterior surface of the zoom cam tube 401 includes a cam groove 406 that spirals around at least a portion of the exterior surface of the zoom cam tube 401.

In at least one embodiment, the linear power adjustment mechanism further includes a cam pin 403 coupled to an end of the actuation rod 302. The cam pin 403 engages the cam groove 406 to cause the zoom cam tube 401 to rotate around the longitudinal axis of the scope tube 101 when the lever 301 is actuated.

In at least one embodiment, the linear power adjustment mechanism further includes a guide groove 410 that guides the cam pin 403 and, together with the cam groove 406, causes the zoom cam tube 401 to rotate when the lever 301 is actuated.

In at least one embodiment, the cam tube 201 is fixedly connected to the zoom cam tube 401 via a through hole 203 on the cam tube 201 and a threaded through hole 405 on the zoom cam tube 401.

In at least one embodiment, the lever 301 is mounted on left side of the telescopic sight 300 from a perspective of a user of the firearm.

In at least one embodiment, the lever 301 is mounted on right side of the telescopic sight 300 from a perspective of a user of the firearm.

In at least one embodiment, the lever 301 is mounted on both left and right sides of the telescopic sight 300 from a perspective of a user of the firearm.

In another aspect, an apparatus in accordance with the present disclosure may comprise a firearm and the telescopic sight 300 mounted on the firearm. The telescopic sight includes a lens set 413, a scope tube 101 that contains a lens tube 412 and a cam tube 201, an eyepiece set 103, and a linear power adjustment mechanism. The lens set 413 includes at least a first optical lens 414 and a second optical lens 415. The lens set 413 is contained in the lens tube 412, which is contained in the cam tube 201. The lens tube 412 is non-rotatable with respect to the scope tube 101 and is configured to allow the optical lenses 414 and 415 of the lens set 413 to slide therein along with a longitudinal axis of the scope tube 101. The eyepiece set 103 is coupled to one end of the scope tube 101 (e.g., the rear end which is toward the user of the firearm). The linear power adjustment mechanism is configured to adjust a zooming power of the telescopic sight 300, and includes a zoom cam tube 401 and a lever 301. The cam tube 201 is contained in and connected to the zoom cam tube 401. The lever 301 is coupled to rotate the zoom cam tube 401 and is configured to be actuated to move linearly along a direction parallel to the longitudinal axis of the scope tube 101 such that, when actuated, the zoom cam tube 401 and the cam tube 201 rotate around the longitudinal axis of the scope tube 101 with respect to the scope tube 101 and the lens tube 412 to cause a distance between the first and the second optical lenses 414 and 415 along the longitudinal axis of the scope tube 101 to change to adjust the zooming power of the telescopic sight 300.

In at least one embodiment, the linear power adjustment mechanism further includes an actuation rod 302 to which the lever 301 is coupled. The actuation rod 302 is configured to move along the direction parallel to the longitudinal axis of the scope tube 101 when the lever 301 is actuated.

In at least one embodiment, the actuation rod 302 includes an actuation block 402 thereon to which the lever 301 is attached.

In at least one embodiment, an exterior surface of the zoom cam tube 401 includes a cam groove 406 that spirals around at least a portion of the exterior surface of the zoom cam tube 401.

In at least one embodiment, the linear power adjustment mechanism further includes a cam pin 403 coupled to an end of the actuation rod 302. The cam pin 403 engages the cam groove 406 to cause the zoom cam tube 401 to rotate around the longitudinal axis of the scope tube 101 when the lever 301 is actuated.

In at least one embodiment, the linear power adjustment mechanism further includes a guide groove 410 that guides the cam pin 403 and, together with the cam groove 406, causes the zoom cam tube 401 to rotate when the lever 301 is actuated.

In at least one embodiment, the cam tube 201 is fixedly connected to the zoom cam tube 401 via a through hole 203 on the cam tube 201 and a threaded through hole 405 on the zoom cam tube 401.

In at least one embodiment, the lever 301 is mounted on left side of the telescopic sight 300 from a perspective of a user of the firearm.

In at least one embodiment, the lever 301 is mounted on right side of the telescopic sight 300 from a perspective of a user of the firearm.

In at least one embodiment, the lever 301 is mounted on both left and right sides of the telescopic sight 300 from a perspective of a user of the firearm.

These and other objectives of the present disclosure will be appreciated by those of ordinary skill in the art after reading the following detailed description of the preferred embodiments that are illustrated in the various figures and drawings.

CONCLUSION

It will be apparent to those skilled in the art that various modifications and variations can be made to the structure of the present disclosure without departing from the scope or spirit of the present disclosure. Moreover, although examples given in the present disclosure are directed to firearms and usage of the proposed telescopic sight with firearms, there is no limit on the applications of embodiments of the telescopic sight disclosed herein. That is, any suitable implementation or application using an embodiment of the present disclosure, or variation thereof, is still within the scope of the present disclosure. In view of the foregoing, it is intended that the present disclosure cover modifications and variations of the present disclosure in view of the scope of the following claims and their equivalents.

What is claimed is:

1. A telescopic sight for a firearm, comprising:
    a lens set comprising at least a first optical lens and a second optical lens;
    a scope tube, the scope tube containing:
        a lens tube in which the lens set is contained; and
        a cam tube in which the lens tube is contained,
    wherein the lens tube is non-rotatable with respect to the scope tube and configured to allow the optical lenses of the lens set to slide therein along with a longitudinal axis of the scope tube;
    an eyepiece set coupled to one end of the scope tube; and
    a linear power adjustment mechanism configured to adjust a zooming power of the telescopic sight, the linear power adjustment mechanism comprising:
        a zoom cam tube which is coaxial with the cam tube such that the cam tube is contained in the zoom cam tube and connected to the zoom cam tube; and
        a lever coupled to rotate the zoom cam tube and configured to be actuated to move linearly along a direction parallel to the longitudinal axis of the scope tube such that, when actuated, the zoom cam tube and the cam tube rotate coaxially around the longitudinal axis of the scope tube with respect to the scope tube and the lens tube to cause a distance between the first and the second optical lenses along the longitudinal axis of the scope tube to change to adjust the zooming power of the telescopic sight.

2. The telescopic sight of claim 1, wherein the linear power adjustment mechanism further comprises an actuation rod to which the lever is coupled, the actuation rod configured to move along the direction parallel to the longitudinal axis of the scope tube when the lever is actuated.

3. The telescopic sight of claim 2, wherein the actuation rod includes an actuation block thereon to which the lever is attached.

4. The telescopic sight of claim 2, wherein an exterior surface of the zoom cam tube includes a cam groove that spirals around at least a portion of the exterior surface of the zoom cam tube.

5. The telescopic sight of claim 4, wherein the linear power adjustment mechanism further comprises a cam pin coupled to an end of the actuation rod, and wherein the cam pin engages the cam groove to cause the zoom cam tube to rotate around the longitudinal axis of the scope tube when the lever is actuated.

6. The telescopic sight of claim 2, wherein the linear power adjustment mechanism further comprises a guide groove that guides the cam pin and, together with the cam groove, causes the zoom cam tube to rotate when the lever is actuated.

7. The telescopic sight of claim 1, wherein the cam tube is fixedly connected to the zoom cam tube via a through hole on the cam tube and a threaded through hole on the zoom cam tube.

8. The telescopic sight of claim 1, wherein the lever is mounted on left side of the telescopic sight from a perspective of a user of the firearm.

9. The telescopic sight of claim 1, wherein the lever is mounted on right side of the telescopic sight from a perspective of a user of the firearm.

10. The telescopic sight of claim 1, wherein the lever is mounted on both left and right sides of the telescopic sight from a perspective of a user of the firearm.

11. An apparatus, comprising:
a firearm; and
a telescopic sight mounted on the firearm, the telescopic sight comprising:
   a lens set comprising at least a first optical lens and a second optical lens;
   a scope tube, the scope tube containing:
      a lens tube in which the lens set is contained; and
      a cam tube in which the lens tube is contained,
      wherein the lens tube is non-rotatable with respect to the scope tube and configured to allow the optical lenses of the lens set to slide therein along with a longitudinal axis of the scope tube;
   an eyepiece set coupled to one end of the scope tube; and
   a linear power adjustment mechanism configured to adjust a zooming power of the telescopic sight, the linear power adjustment mechanism comprising:
      a zoom cam tube which is coaxial with the cam rube such that the cam tube is contained in the zoom cam tube and connected to the zoom cam tube; and
      a lever coupled to rotate the zoom cam tube and configured to be actuated to move linearly along a direction parallel to the longitudinal axis of the scope tube such that, when actuated, the zoom cam tube and the cam tube rotate coaxially around the longitudinal axis of the scope tube with respect to the scope tube and the lens tube to cause a distance between the first and the second optical lenses along the longitudinal axis of the scope tube to change to adjust the zooming power of the telescopic sight.

12. The apparatus of claim 11, wherein the linear power adjustment mechanism further comprises an actuation rod to which the lever is coupled, the actuation rod configured to move along the direction parallel to the longitudinal axis of the scope tube when the lever is actuated.

13. The apparatus of claim 12, wherein the actuation rod includes an actuation block thereon to which the lever is attached.

14. The apparatus of claim 12, wherein an exterior surface of the zoom cam tube includes a cam groove that spirals around at least a portion of the exterior surface of the zoom cam tube.

15. The apparatus of claim 14, wherein the linear power adjustment mechanism further comprises a cam pin coupled to an end of the actuation rod, and wherein the cam pin engages the cam groove to cause the zoom cam tube to rotate around the longitudinal axis of the scope tube when the lever is actuated.

16. The apparatus of claim 12, wherein the linear power adjustment mechanism further comprises a guide groove that guides the cam pin and, together with the cam groove, causes the zoom cam tube to rotate when the lever is actuated.

17. The apparatus of claim 11, wherein the cam tube is fixedly connected to the zoom cam tube via a through hole on the cam tube and a threaded through hole on the zoom cam tube.

18. The apparatus of claim 11, wherein the lever is mounted on left side of the telescopic sight from a perspective of a user of the apparatus.

19. The apparatus of claim 11, wherein the lever is mounted on right side of the telescopic sight from a perspective of a user of the apparatus.

20. The apparatus of claim 11, wherein the lever is mounted on both left and right sides of the telescopic sight from a perspective of a user of the apparatus.

* * * * *